United States Patent
Kajimura

(10) Patent No.: US 9,516,213 B2
(45) Date of Patent: Dec. 6, 2016

(54) IMAGE PROCESSING APPARATUS, IMAGE CAPTURING APPARATUS, AND CONTROL METHOD THEREOF

(71) Applicant: CANON KABUSHIKI KAISHA, Tokyo (JP)

(72) Inventor: Fumihiro Kajimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 62 days.

(21) Appl. No.: 14/676,186

(22) Filed: Apr. 1, 2015

(65) Prior Publication Data
US 2015/0288867 A1     Oct. 8, 2015

(30) Foreign Application Priority Data

Apr. 2, 2014  (JP) ................. 2014-076458

(51) Int. Cl.
*H04N 5/232*   (2006.01)
*H04N 5/217*   (2011.01)
*H04N 5/225*   (2006.01)

(52) U.S. Cl.
CPC ........ *H04N 5/23212* (2013.01); *H04N 5/2171* (2013.01); *H04N 5/2254* (2013.01)

(58) Field of Classification Search
CPC  H04N 5/23212; H04N 5/2171; H04N 5/2254; H04N 1/00909; H04N 1/4097; H04N 13/0282; G02B 27/006; G06T 2207/10052; G06T 2200/21
See application file for complete search history.

(56) References Cited

U.S. PATENT DOCUMENTS

| | | | |
|---|---|---|---|
| 2007/0122056 A1* | 5/2007 | Steinberg | H04N 5/2171 348/E5.081 |
| 2010/0074554 A1* | 3/2010 | Gyotoku | H04N 5/2171 382/275 |
| 2013/0162866 A1* | 6/2013 | Kimura | H04N 5/2173 348/231.99 |
| 2013/0194387 A1* | 8/2013 | Hatakeyama | H04N 5/3572 348/46 |
| 2014/0028896 A1* | 1/2014 | Oshima | H04N 5/23212 348/350 |
| 2014/0184861 A1* | 7/2014 | Georgiev | H04N 5/225 348/262 |

(Continued)

FOREIGN PATENT DOCUMENTS

JP    2007-004471 A    1/2007

*Primary Examiner* — Jason Flohre
(74) *Attorney, Agent, or Firm* — Cowan, Liebowitz & Latman, P.C.

(57) ABSTRACT

An image processing apparatus comprises an acquiring unit configured to acquire pixel signals in which light fluxes from a subject are stored, each pixel signal being such that a pixel has stored a pupil-divided light flux obtained by performing pupil division on the light flux; a determination unit configured to determine, with respect to pixels of the pixel signals that are associated with a predetermined region, whether or not a pixel value of each pixel satisfies a predetermined relationship to a pixel value of a pixel having stored another light flux from the same subject; and a detection unit configured to detect that there is an external factor that varies the pixel value in the predetermined region if the pixels of the pixel signals include a predetermined number or more of pixels that are determined to satisfy the predetermined relationship.

14 Claims, 10 Drawing Sheets

(56) References Cited

U.S. PATENT DOCUMENTS

2014/0192237 A1* 7/2014 Ikedo ..................... H04N 5/367
   348/246
2014/0198239 A1* 7/2014 Suzuki ............... H04N 5/23212
   348/246

* cited by examiner

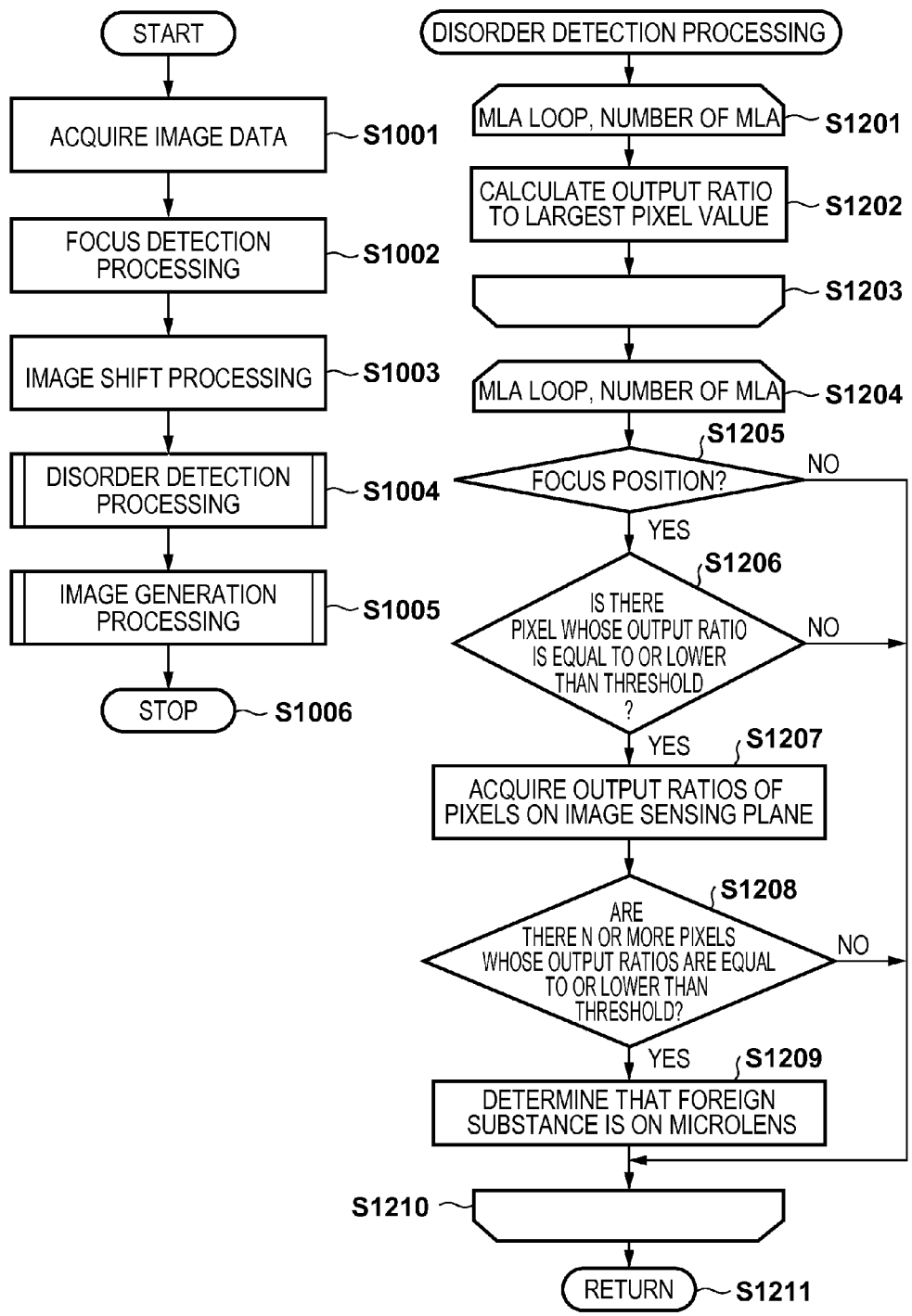

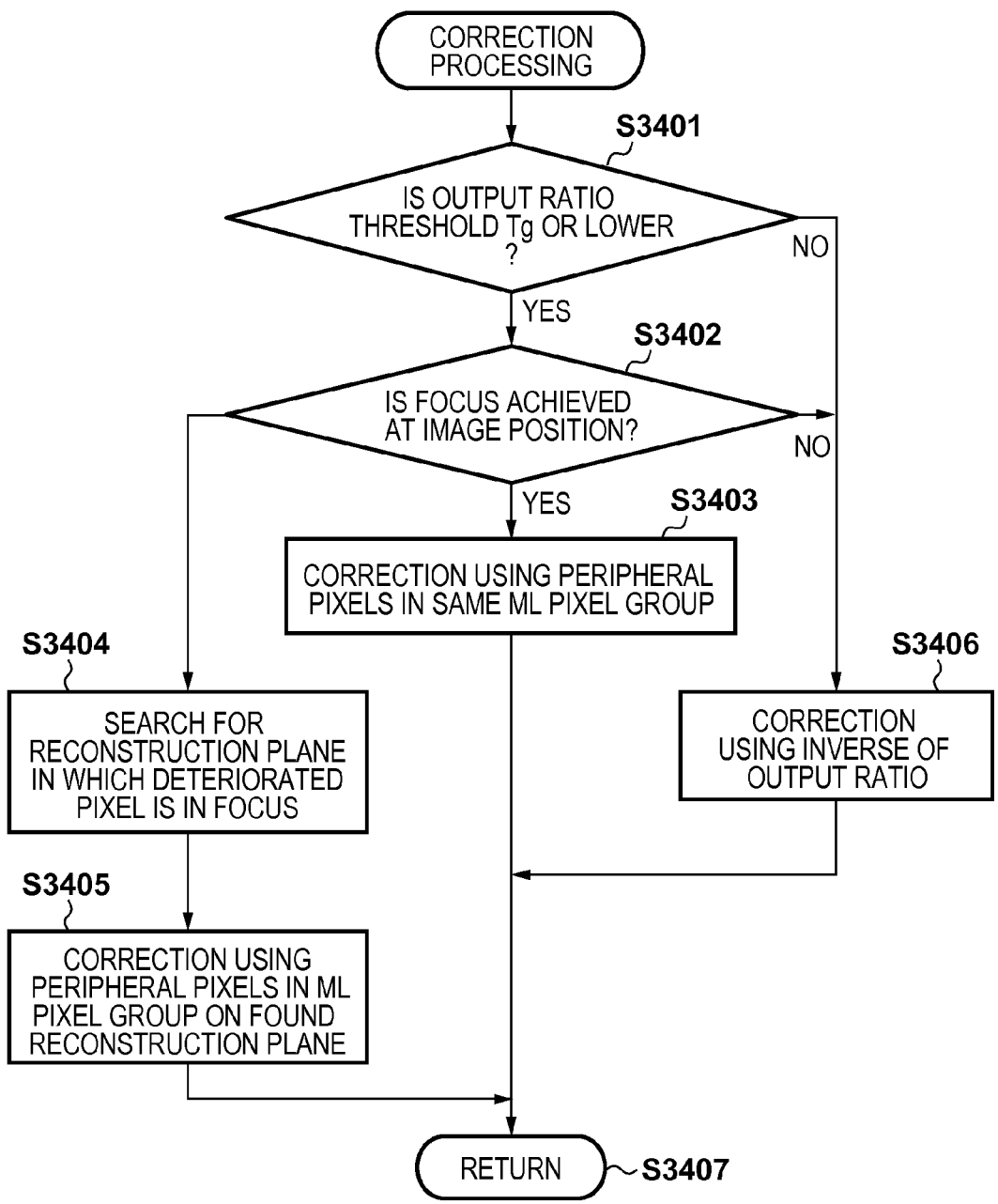

IMAGE PROCESSING APPARATUS, IMAGE CAPTURING APPARATUS, AND CONTROL METHOD THEREOF

BACKGROUND OF THE INVENTION

Field of the Invention

The present invention relates to an image processing apparatus, an image capturing apparatus, and a control method, and in particular to a technique for detecting a decrease in pixel signal output due to an external factor.

Description of the Related Art

Some image capturing apparatuses such as digital cameras are capable of storing, as light field information, an intensity distribution of a light flux that is reflected from a subject and incident on an image sensing plane together with information on an incident direction. Such an image capturing apparatus can use the light field information stored by shooting to reproduce an intensity distribution of the light flux at a predetermined focal position after the shooting, and to generate (reconstruct) an image (reconstruction image) that is in focus at the corresponding subject distance (Japanese Patent Laid-Open No. 2007-4471).

However, an output of a pixel signal obtained by shooting using an image capturing apparatus may differ from a signal output that is supposed to be obtained, corresponding to a light flux that is to be used for image formation on pixels. Furthermore, in the image capturing apparatus disclosed in Japanese Patent Laid-Open No. 2007-4471, if such a decrease in signal output occurs, a correct intensity distribution cannot be reproduced when the reconstruction image is generated using the acquired light field information, resulting in a deterioration of an image quality of the reconstruction image.

One factor of varying a pixel signal output is a local sensitivity defect occurring in a semiconductor (photoelectric conversion element) that constitutes an image sensor. Such a sensitivity defect includes an initial defect that occurs in a manufacturing process of the image sensor, and a latter defect such as aging. A pixel that causes such a sensitivity defect can be detected by, for example, a method of detecting occurrence of a dark current in a light shielding state.

Furthermore, a signal output may also vary due to the existence of a foreign substance incorporated in the image capturing apparatus on a light path of a reflected light flux. For example, when a microlens is arranged on the light path as in Japanese Patent Laid-Open No. 2007-4471, a signal output may decrease due to a foreign substance such as dust or mote that is attached to the microlens. Specifically, if the foreign substance is attached to the microlens, a light flux that passes through the microlens will partially be shielded, thus causing a decrease in signal output. Because the light field information is particularly acquired by the microlens separating an incident light flux into different multiple incident directions, a decrease in signal output occurs in at least some of pixels of a pixel group associated with the microlens. A decrease in signal output may also occur, when the microlens is used, due to a scratch, crack, or the like on the microlens as well.

However, it is difficult to determine whether the factor of varying a pixel signal output is a sensitivity defect of the semiconductor or an external factor such as a scratch of the microlens or an attached foreign substance.

SUMMARY OF THE INVENTION

The present invention has been made in consideration of the aforementioned problems, and realizes a technique that enables detection of a varied output of a pixel signal due to an external factor.

In order to solve the aforementioned problems, the present invention provides an image processing apparatus comprising: an acquiring unit configured to acquire pixel signals in which light fluxes from a subject are stored, each pixel signal being such that a pixel has stored a pupil-divided light flux obtained by performing pupil division on the light flux incident on a region that is associated with that pixel; a determination unit configured to determine, with respect to pixels of the pixel signals that are associated with a predetermined region, whether or not a pixel value of each pixel satisfies a predetermined relationship to a pixel value of a pixel having stored another light flux from the same subject as that of that pixel of the pixel signals; and a detection unit configured to detect that there is an external factor that varies the pixel value in the predetermined region if the pixels of the pixel signals that are associated with the predetermined region include a predetermined number or more of pixels that are determined to satisfy the predetermined relationship by the determination unit.

In order to solve the aforementioned problems, the present invention provides a control method of an image processing apparatus, the control method comprising: an acquisition step of acquiring pixel signals in which light fluxes from a subject are stored, each pixel signal being such that a pixel has stored a pupil-divided light flux obtained by performing pupil division on the light flux incident on a region that is associated with that pixel; a determination step of determining, with respect to pixels of the pixel signals that are associated with a predetermined region, whether or not a pixel value of each pixel satisfies a predetermined relationship to a pixel value of a pixel having stored another light flux from the same subject as that of that pixel of the pixel signals; and a detection step of detecting that there is an external factor that varies the pixel value in the predetermined region if the pixels of the pixel signals that are associated with the predetermined region include a predetermined number or more of pixels that are determined to satisfy the predetermined relationship in the determination step.

According to the present invention, it is possible to detect a varied output of a pixel signal due to an external factor.

Further features of the present invention will become apparent from the following description of exemplary embodiments (with reference to the attached drawings).

BRIEF DESCRIPTION OF THE DRAWINGS

FIGS. 6A and 6B are flowcharts showing operation sequences of processing for detecting a disorder according to the first embodiment.

FIG. 10 is a flowchart showing an operation sequence of correction processing according to a third embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

The following will describe, as an example of an image processing apparatus, a digital camera 100 to which the present invention is applied and that is capable of storing light field information (LF data) constituted by pixel values that have information on the intensity and incident angles of light fluxes reflected from a subject. However, the present invention is not necessarily limited to the configuration capable of storing LF data, and is also applicable to an apparatus that can read stored LF data and detect a decrease in pixel output.

1. Configuration of Digital Camera 100

Figure 2:
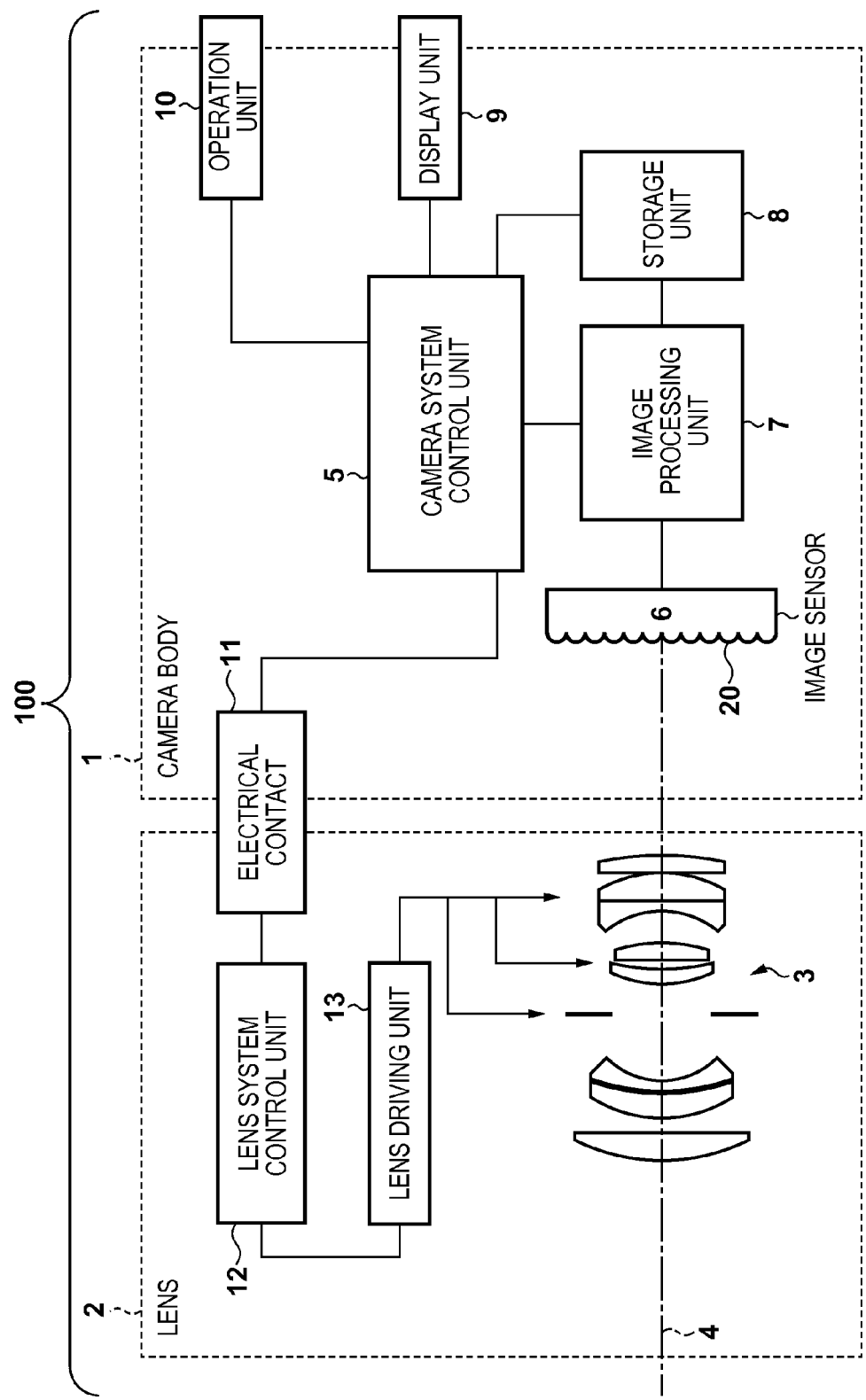
FIG. 2 is a block diagram showing an example of a functional configuration of a digital camera 100 according to the first embodiment.

FIG. 2 is a block diagram showing an example of a functional configuration of the digital camera 100 of the present embodiment.

The digital camera 100 of the present embodiment is constituted by a camera body 1, and a detachable lens 2. The camera body 1 and the lens 2 are mechanically connected to each other via a lens mount (not shown), and are electrically connected to each other by being contacted by an electrical contact 11 that is shared by the camera body 1 and the lens 2.

A light flux reflected from a subject is used for image formation on light receiving elements of an image sensor 6 via an imaging optical system 3. An optical axis 4 is an optical axis of the imaging optical system 3. In the present embodiment, a microlens array (MLA) 20 is arranged between the image sensor 6 and the imaging optical system 3, and microlenses are arranged in a grid on the MLA 20. A plurality of photoelectric conversion elements of the image sensor is associated with each microlens, and a light flux incident on the microlens is received and photoelectrically converted by the plurality of photoelectric conversion elements. That is, a light flux that has passed through an exit pupil of the imaging optical system 3 is expanded by the microlenses in a plurality of incident directions, and is received by the plurality of photoelectric conversion elements. Accordingly, the photoelectric conversion elements associated with one microlens each output a pixel signal that corresponds to the light flux that has passed through a divided pupil region. That is, since the image sensor 6 of the present embodiment can further separate the light fluxes incident on the positions of the microlenses of the MLA 20 in incident directions and can photoelectrically convert the separated light fluxes, the image sensor 6 can output the pixel signals as above-described LF data. Note that the functions and arrangement of the MLA 20 will be described in detail later with reference to FIG. 3.

An image processing unit 7 applies various types of image processing to the LF data that was output by the image sensor 6, and generates data to be stored. The image processing unit 7 includes an A/D converter, a white balance circuit, a gamma correction circuit, and the like, and applied various types of image processing to the input LF data. Furthermore, the image processing unit 7 performs, on the input LF data, processing for detecting a microlens disorder that serves as a factor of a decrease in a pixel output. Note that in the present embodiment, "microlens disorder" refers to an external factor that causes a decrease in output, such as a scratch of a microlens and a foreign substance attached to the microlens, as described above, rather than a sensitivity defect of the image sensor 6. Furthermore, when having detected a microlens disorder from the input LF data, the image processing unit 7 corrects the detected disorder and then performs processing for generating a reconstruction image that is in focus at a given subject distance. Furthermore, the image processing unit 7 may have a circuit in which the data to be stored, such as LF data, an image, a video, or a sound, is compressed/decompressed when data to be stored has a predetermined encoding format. In this case, the image processing unit 7 generates data that is to be displayed on, for example, a display unit 9, which will be described later, by compressing the data to be stored and then transmitting the compressed data to the storage unit 8 so that the data is stored therein, or by reading the data stored in the storage unit 8 and decompresses the read data.

The storage unit 8 is a storage medium in which input data is stored. The storage unit 8 includes, in addition to the storage medium, a circuit for reading and writing data from and into the storage medium, and is configured to store data input from the image processing unit 7 to the storage medium, and to read data stored in the storage medium.

A camera system control unit 5 is, for example, a programmable processor such as a CPU or MPU. The camera system control unit 5 controls operation of the blocks by reading a program stored in, for example, a nonvolatile memory (not shown), expanding the read program on a RAM (not shown), and executing the program. When, for example, an operation unit 10 detects an operation using a release button, the camera system control unit 5 controls driving of the image sensor 6, the operation of the image processing unit 7, and the like, and displays, if needed, an image or information on the display unit 9. The camera system control unit 5 obtains an appropriate focal position and an f-number based on the processing result of the image processing unit 7, and controls a lens system control unit 12 via the electrical contact 11.

The lens system control unit 12 controls a lens driving unit 13 appropriately in accordance with an instruction from the camera system control unit 5. A shake detection sensor (not shown) is connected to the lens system control unit 12. When an image stabilization mode is set, the lens system control unit 12 appropriately controls an image stabilizing lens via the lens driving unit 13 in response to a signal of the shake detection sensor. The lens driving unit 13 can drive a focus lens, the image stabilizing lens, a diaphragm, and the like.

The operation unit 10 is a user interface of the digital camera 100. Upon detecting, for example, an operation input by the release button or an operation input for changing the focal distance, f-number, or the like, the operation unit 10 outputs a control signal that corresponds to the operation to the camera system control unit 5.

2. Description of Imaging Optical System

Figure 3A:
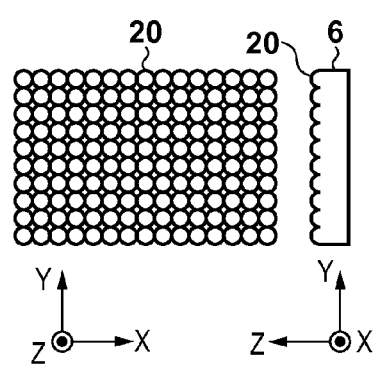
FIGS. 3A to 3C are diagrams schematically showing the relationship among an image sensor 6, a microlens array 20, and an imaging optical system 3 of the digital camera 100 according to the first embodiment.

FIG. 3A schematically shows the relationship between the image sensor 6 and the MLA 20. As shown in the side view of FIG. 3A, the image sensor 6 and the MLA 20 are configured as a single member. In the present embodiment, the MLA 20 on the image sensor 6 is arranged such that the center point on the front side of each microlens is located near an image forming surface of the imaging optical system 3. Furthermore, as shown in the front view of FIG. 3A (in which the MLA 20 is viewed in a negative direction of the z-axis), the MLA 20 is arranged so as to cover the photoelectric conversion elements (hereinafter, referred to as pixels) of the image sensor 6.

Figure 3B:
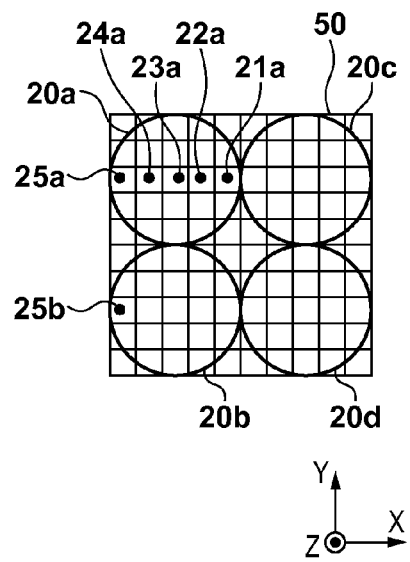

Here, as shown in FIG. 3B, a plurality of pixels of the image sensor 6 is associated with each microlens of the MLA 20. In FIG. 3B, a border of a grid indicates each pixel of the image sensor 6, and circles 20a, 20b, 20c, and 20d show respective microlenses. In the digital camera 100 according to the present embodiment, 25 (5 lows×5 columns) pixels are associated with a single microlens, as shown in FIG. 3B (that is, the dimension of each microlens is 5×5 times larger than the dimension of one pixel).

Figure 3C:
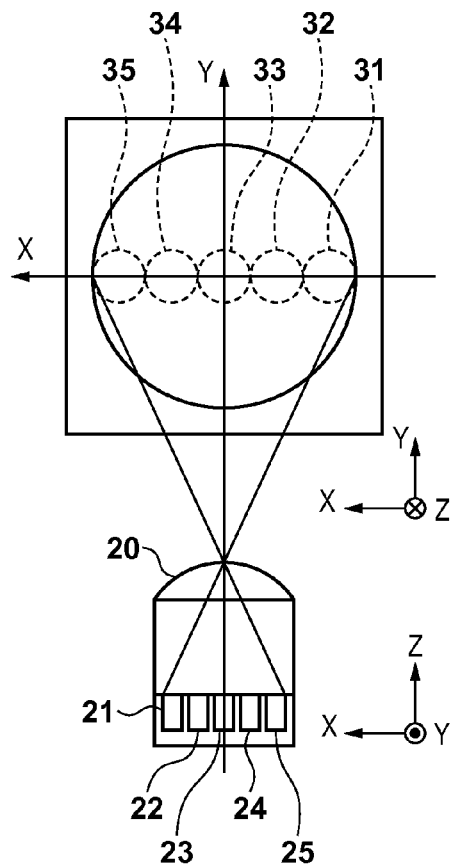

Furthermore, FIG. 3C shows the correspondence relationship between a light flux that is incident on the pixels of the image sensor 6 that are associated with each microlens of the MLA 20, and pupil regions of the imaging optical system 3. In FIG. 3C, for the sake of convenience, one microlens and the pixels of the image sensor 6 associated with the lens that are shown on a XZ-cross-section, which is taken along the center point of the microlens and orthogonal to the Y-axis, and the pupil regions that are shown on an exit pupil surface (XY-plane), which is orthogonal to the Z-axis, are developed on the same plane. In FIG. 3C, pixels 21 to 25 correspond to pixels 21a to 25a of, for example, FIG. 3B, and a light flux that has passed through each divided pupil region is incident on the corresponding pixel. That is, the microlenses of the MLA 20 are designed to conjugate the respective pixels 21 to 25 with the specific divided pupil regions on the exit pupil surface of the imaging optical system 3. In the example of FIG. 3C, the pixel 21 is conjugated with a region 31, the pixel 22 is conjugated with a region 32, the pixel 23 is conjugated with a region 33, the pixel 24 is conjugated with a region 34, and the pixel 25 is conjugated with a region 35. Accordingly, when the position of a microlens and the distance between the exit pupil surface and the image sensor 6 are determined, it is practically possible to acquire information on an incident angle of a light flux that is incident on each of pixels associated with the microlens.

3. Image Shift Processing and Image Generation Processing

In the context of the present embodiment, "generation of a reconstruction image" refers to processing for generating an image that is in focus at a given subject distance using LF data that is acquired with respect to an image sensing plane.

In generation of a reconstruction image, (1) a ray distribution on an image surface (reconstruction plane or focal plane) corresponding to a subject distance at which focus is to be achieved is reproduced based on the LF data, and (2) a pixel value of each pixel of the reconstruction image is determined based on the light flux that corresponds to that pixel. The ray distribution on the reconstruction plane is equivalent to LF data that is obtained when shooting is performed with the MLA 20 and the image sensor 6 arranged at positions on the reconstruction plane. Specifically, the image processing unit 7 first specifies a position on the reconstruction plane through which a light flux corresponding to each pixel of the LF data obtained by image-capturing has passed, based on the positional relationship between the image sensing plane and the reconstruction plane and an incident direction of the light flux corresponding to each pixel of the LF data. That is, the image processing unit 7 specifies a correspondence relationship between light fluxes that are received by pixels when shooting is performed with the image sensor 6 arranged virtually on the reconstruction plane, and light fluxes that are received by pixels of the stored LF data.

Figure 4:
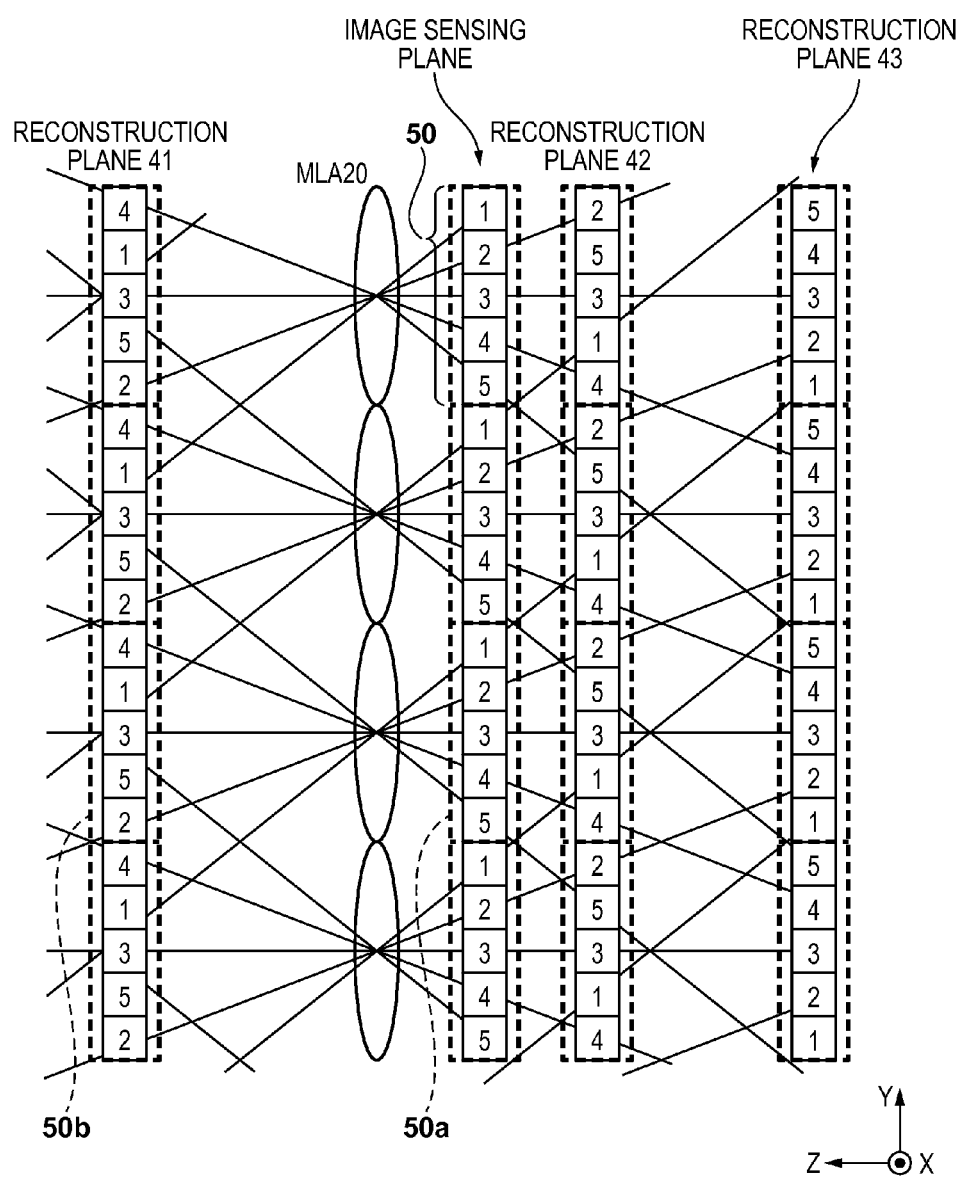
FIG. 4 is a diagram schematically showing a reconstruction image generating method according to the first embodiment.

FIG. 4 shows the correspondence between the LF data that is acquired with respect to the image sensing plane and LF data to be reproduced on the reconstruction plane when 5×5 pixels of the image sensor 6 are associated with each microlens as shown in FIG. 3B, for example. Note that pixels on the image sensing plane and the reconstruction plane are arrayed two-dimensionally, but FIG. 4 shows, for ease of description, a pixel array in which pixels are arrayed one-dimensionally in the Y-axis direction.

In FIG. 4, numbers "1" to "5" are given to the pixels of the LF data that is acquired with respect to the image sensing plane so that divided pupil regions through which corresponding light fluxes pass are identifiable. The pixels that are associated with each microlens of the MLA 20 receive light fluxes that are expanded in incident directions by that microlens, and thus it is possible to specify the light path of the light flux that is incident on each pixel. In FIG. 4, the light path of the light flux corresponding to each pixel of the LF data acquired with respect to the image sensing plane is determined based on the positional relationship between that pixel and the microlens with which that pixel is associated, and is indicated by a straight line. That is, since information on these light paths can be obtained from the LF data acquired with respect to the image sensing plane, it is possible to specify the positions through which the light fluxes pass on the reconstruction plane that is set at a different position from that of the image sensing plane. As shown in FIG. 4, for example, the light flux that corresponds to a pixel "2" of an ML pixel group 50, which is associated with one microlens, passes through a different pixel position of a virtual pixel group on the reconstruction plane 41 that corresponds that microlens. In FIG. 4, in order to clearly show pixels of the image sensors arranged virtually on the reconstruction planes 41, 42, and 43 through which the light fluxes corresponding to the pixels of the LF data pass, the numbers for identifying the divided pupil regions are given to the pixels. As is clear from the drawing, it is possible to specify the correspondence relationship between the pixels of the LF data acquired with respect to the image sensing plane and pixels of LF data that is to be acquired when the image sensor is arranged on a given reconstruction plane, based on the information on the light paths of the light fluxes that correspond to the pixels of the LF data acquired with respect to the image sensing plane.

After having specified the correspondence relationship of the LF data with respect to the image sensing plane to that of the reconstruction plane on which a reconstruction image is to be generated, the image processing unit 7 arranges (rearrange) the pixels of the LF data so as to generate LF data (reproduction information) to be acquired with respect to the reconstruction plane. In the present embodiment, processing for generating the reproduction information, that is, processing for arranging the pixels of the LF data so as to show a ray distribution on the reconstruction plane is referred to as image shift processing.

The image processing unit 7 generates a reconstruction image based on the reproduction information generated in this manner. LF data is acquired by dividing an optical image formed on each microlens of the MLA 20 into pupil regions so that the divided optical images are received by the corresponding pixels. Accordingly, by summing up the pixel values of a pixel group (hereinafter, referred to as an ML pixel group) that is associated with each microlens and constituted by as many pixels as the pupil division count, it is possible to obtain the pixel value that corresponds to the optical image formed on that microlens, and to generate a reconstruction image that corresponds to the image sensing plane. On the other hand, when generating a reconstruction image that is in focus at an arbitrary subject distance, similarly summing-up of the pixel values suffices for each microlens in the case where the MLA 20 and the image sensor are arranged virtually on the reconstruction plane. That is, the pixel values of pixels of a reconstruction image that is in focus at an arbitrary subject distance can be obtained by summing up the pixel values of pixels constituting each ML pixel group included in the reproduction information. Accordingly, it is possible to generate a reconstruction image that has as many pixels are the number of the microlenses of the MLA 20. In the present embodiment, processing for determining the pixel value of each pixel of the reconstruction image by summing-up the pixel values based on the LF data (reproduction information) after the image shift processing and generating a reconstruction image is referred to as image generation processing.

FIG. 4 shows an example in which the ML pixel group 50 on the image sensing plane is generated by summing up as many pixels as the pupil division count. For example, with respect to an ML pixel group 50a on the image sensing plane, by summing up pixel values of the light fluxes that are incident on the pixels, namely, pixels 1 to 5 that constitute that ML pixel group, it is possible to obtain the pixel value that corresponds to an optical image formed on the corresponding microlens. On the other hand, regarding the correspondence relationship of the LF data on pixels constituting an ML pixel group 50b on the reconstruction plane 41, the pixels 2, 3, and 4 of the ML pixel group 50a on the image sensing plane, the pixel 1 of one adjacent ML pixel group, and the pixel 5 of the other adjacent ML pixel group are specified to constitute the ML pixel group 50b, for example. Also, the specified pixels are arranged (image-shifted) on the ML pixel group 50b, and the pixel values of the ML pixel group 50b on the reconstruction plane 41 is obtained by summing up the pixel values of the pixels (image-generation). Note that the summing-up is performed each on the assumption that a weighting coefficient is 1. This summing-up processing is performed sequentially with respect to the microlenses. With these types of processing, image-generation on the reconstruction plane 42 and the reconstruction plane 43 that are shown in FIG. 4 is also possible. Furthermore, an output of an ML pixel group by summing-up of pixels assuming that, for example, only the pixel value of the pixel 3 of a predetermined microlens has a weighting coefficient of 1 and the pixel values of the remaining pixels have a weighting coefficient of 0 results in an image equivalent to that of the state in which pupil is narrowed down, that is, an image equivalent to the case where light fluxes incident on the image sensor are restricted to a light flux that passing through the central divided pupil. Therefore, the image has a larger depth of field than that of an image obtained by summing up all the pixels.

4. Microlens Disorder Detection Processing

Processing for detecting a microlens disorder will be described taking a case where a foreign substance is attached to a surface of a microlens of the MLA 20 as an example.

As described above, a light flux that is incident on each microlens is separated in multiple incident directions and received by a pixel group (that is, an ML pixel group) that corresponds to the microlens. Accordingly, when a foreign substance is attached to a microlens, the light flux received by the ML pixel group is partially shielded, and outputs of pixels constituting the ML pixel group is decreased. At that time, since the light fluxes that have multiple incident angles are partially and uniformly shielded, outputs of the pixels are decreased at the same ratio with respect to the case where no foreign substance is attached. Furthermore, as described above, in the image generation processing, the pixel values of pixels constituting each ML pixel group on a set reconstruction plane are summed up. Accordingly, when image generation processing is performed using the pixel values of the pixels that are decreased due to the foreign substance, a generated reconstruction image is a deteriorated image due to the decrease in pixel value.

Figure 5:
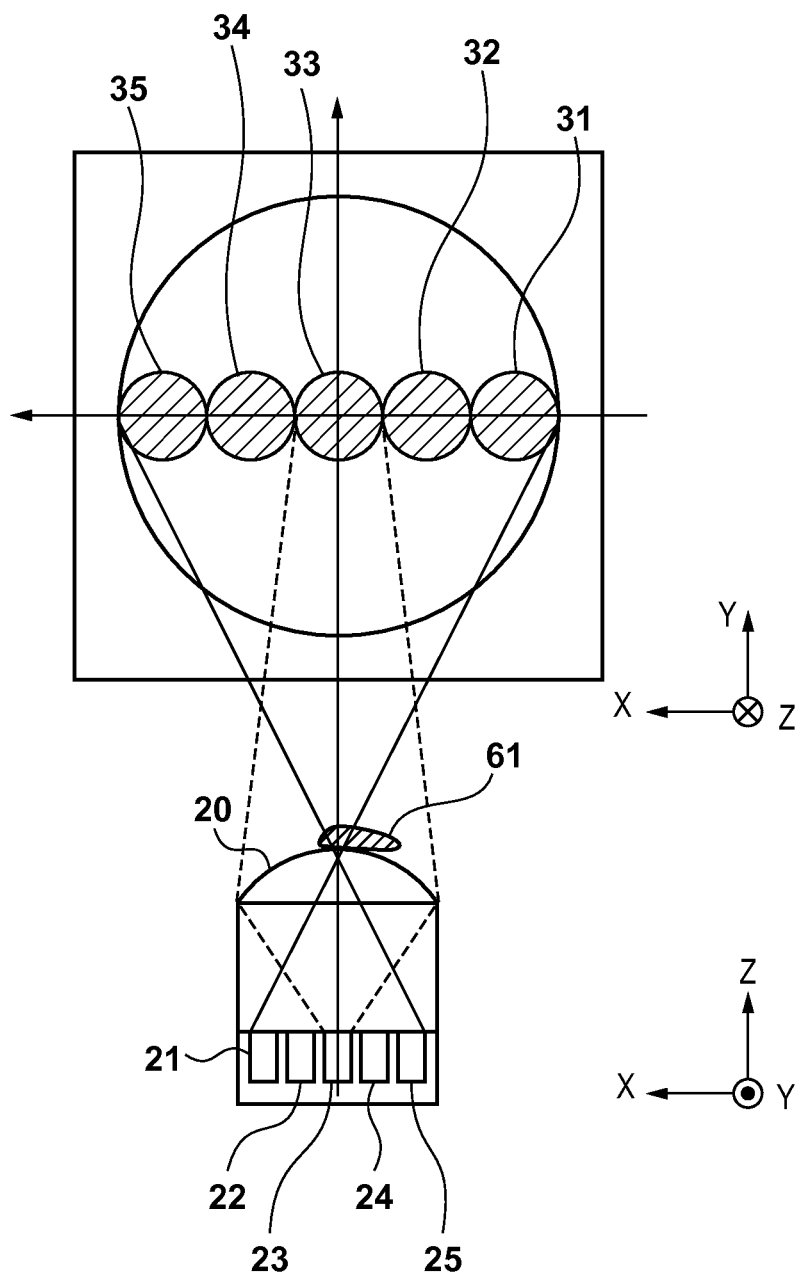
FIG. 5 is a diagram schematically showing the relationship among the image sensor 6, a microlens, and the imaging optical system 3 in a case where a foreign substance is attached.

As shown in FIG. 5, when, for example, a foreign substance 61 is attached to the microlens shown in FIG. 3C, light fluxes that have passed through the regions 31 to 35 on the exit pupil surface of the imaging optical system 3 are partially and uniformly shielded by the foreign substance. Therefore, the pixel values of the pixels 21, 22, 23, 24, and 25 that have received the light fluxes are decreased. The hatching in the regions 31 to 35 on the exit pupil surface indicates that all the pixel values of the pixels that have received the light fluxes having passed through the regions are decreased by the effect of the foreign substance. In the description below, a pixel whose pixel value is decreased by the effect of the foreign substance is referred to simply as a deteriorated pixel.

Figure 1:
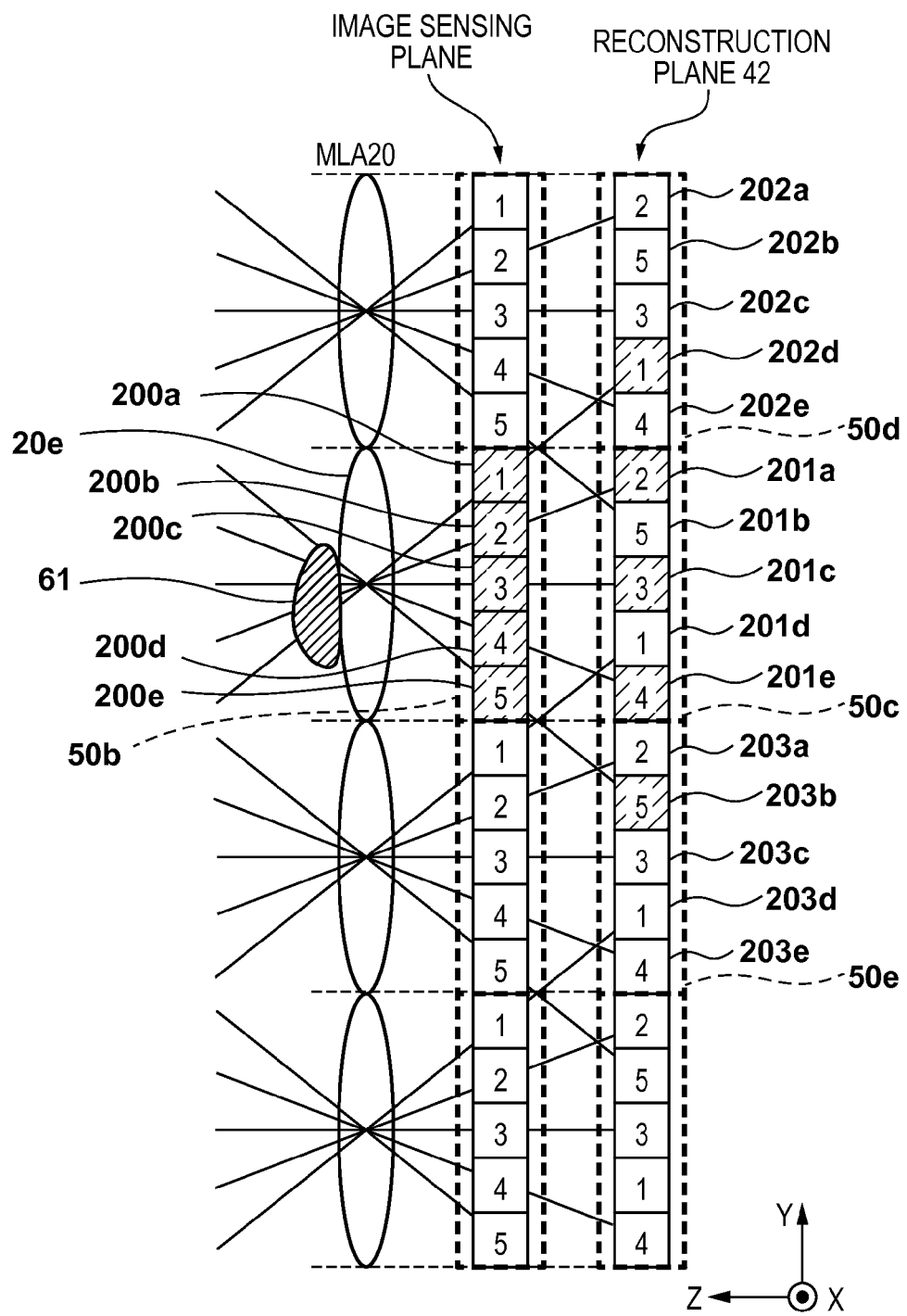
FIG. 1 is a diagram illustrating a method in which a foreign substance attached to a microlens is detected and a reconstruction image in which the effect of the foreign substance is corrected is generated, according to a first embodiment.

In the present embodiment, attachment of a foreign substance is detected using the fact that the pixel values of pixels associated with a microlens to which the foreign substance is attached are decreased by the foreign substance to the same extent. As shown in FIG. 1 for example, when the foreign substance 61 is attached to a microlens 20e, pixels 200a, 200b, 200c, 200d, and 200e on the image sensing plane that are associated with the microlens 20e respectively receive light fluxes that are partially shielded by the foreign substance. In FIG. 1, similarly to FIG. 4, numbers "1" to "5" are given to the pixels of the LF data that is acquired with respect to the image sensing plane so that the divided pupil regions through which corresponding light fluxes pass are identifiable. Furthermore, the pixels (deteriorated pixel) whose pixel values are decreased due to the foreign substance are shown with hatching. When image shift processing is performed on the obtained LF data and a ray distribution is reproduced on the reconstruction plane that corresponds to a predetermined subject distance, the deteriorated pixels on the image sensing plane are arranged so as to be distributed over different ML pixel groups on the reconstruction plane 42. An ML pixel group 50c on the reconstruction plane 42 is constituted by pixels 201a, 201b, 201c, 201d, and 201e, and the pixels 200b, 200c, and 200d on the image sensing plane are arranged on the ML pixel group 50c by the image shift processing. Furthermore, an ML pixel group 50d is constituted by pixels 202a, 202b, 202c, 202d, and 202e, and the pixel 200a on the image sensing plane that is affected by the foreign substance 61 is arranged on the ML pixel group 50d by the image shift processing. Similarly, an ML pixel group 50e is constituted by pixels 203a, 203b, 203c, 203d, and 203e, and the pixel 200e on the image sensing plane is arranged on the ML pixel group 50e by the image shift processing. Note that in the following description, a two-dimensional position on a reconstruction image to which an ML pixel group corresponds is referred to simply as a two-dimensional position.

If there is no foreign substance and a subject is in focus at a two-dimensional position of an ML pixel group on a reconstruction plane, a light flux that is reflected from one point of the subject converges at the microlens that corresponds to the ML pixel group, and thus the pixel values of the pixels constituting the ML pixel group are substantially the same. On the other hand, a case is considered in which there is a foreign substance and a subject is in focus at two-dimensional positions of the ML pixel groups (50c, 50d, and 50e) on the reconstruction plane in which at least one pixel having a decreased pixel value is arranged. In this case, the pixel values of the pixels 201a, 201c, and 201e are decreased at a predetermined ratio with respect to the other pixels 201b and 201d. Accordingly, by obtaining a ratio (that is, an output ratio) of a decreased output pixel value to a high output pixel value (pixel value of a pixel whose output power is not decreased), among pixels constituting the ML pixel group in which focus is achieved, it is possible to specify pixels that are possibly affected by the foreign substance. For example, when an output ratio of the pixels 201a, 201c, and 201e of the ML pixel group 50c is lower than a predetermined value, it is possible to determine that these pixels may be affected by the foreign substance. Note that a value of, for example, 0 to 1 is set for the output ratio, in which 1 shows the case where there is no effect of a foreign substance, and a value lower than 1 shows the case where a pixel value is decreased by the effect of the foreign substance.

In the present embodiment, it is furthermore determined whether the thus specified pixels which may be affected by a foreign substance, are affected by a foreign substance attached to the microlens rather than a sensitivity defect of the semiconductor, that is, a so-called defective pixel. Specifically, the pixel positions of the pixels specified as being possibly affected by the foreign substance in the arrangement on the image sensing plane are specified, and it is determined whether or not other pixels of the corresponding ML pixel group may also affected. Note that in order to make such determination, it is necessary to determine whether or not other pixels of at least the corresponding ML pixel group may also be affected by the above-described foreign substance.

As described above, on the image sensing plane, the pixel values of the pixels of the ML pixel group corresponding to the microlens to which a foreign substance is attached have the same decreased output ratio. Therefore, when, among the pixels on the image sensing plane that constitute the ML pixel group including the pixel specified as being possibly affected by the foreign substance, output ratios of a predetermined number of pixels or more are lower than a predetermined value, it is possible to determine that a foreign substance is attached to the corresponding microlens. In the example of FIG. 1, since the pixel 201a corresponds to the pixel of the ML pixel group 50b on the image sensing plane, the image processing unit 7 determines whether or not the output ratios of the other pixels of the pixels constituting the ML pixel group 50b, that is, the output ratios of the pixels 201c, 201e, 202d, and 203b are also low. If the output ratios are also low, the image processing unit 7 considers that a foreign substance is attached to the microlens 20e, and detects the disorder. Furthermore, it is also possible to determine that a foreign substance is attached when the output ratios are lower than a predetermined value and the output ratios of a predetermined number of pixels or more are the same output ratio within a given range. More appropriate disorder detection is possible using the feature that some pixels of the ML pixel group are uniformly affected by an attached foreign substance. The image processing unit 7 stores, in the storage unit 8, information (hereinafter, referred to simply as detection information) indicating the detection result that a foreign substance was detected. The detection information includes, for example, a position of a microlens to which a foreign substance is attached, addresses on the image sensing plane of pixels associated with the microlens, and output ratios of the pixels.

In the present embodiment, processing for detecting a disorder on a microlens by comparing pixel values or output ratios between pixels of an ML pixel group at the image position that is focused on the reconstruction image, and pixels of an ML pixel group on the corresponding image sensing plane is referred to as "disorder detection processing".

Note that although the present embodiment has described a case where disorder detection is performed on an ML pixel group that is focused at a two-dimensional position on a specific reconstruction plane (for example, the reconstruction plane 42), the disorder detection processing may also be performed while sequentially changing the subject distance that corresponds to the reconstruction plane. Accordingly, while changing the two-dimensional position, it is possible to perform disorder detection on the ML pixel group that is focused at the two-dimensional positions, and wide range detection of a microlens disorder is possible. Furthermore, although the present embodiment has described a case where a foreign substance is attached to a microlens, the above-described disorder detection processing is also applicable to the case where a defect, such as a scratch, is made in a microlens in the manufacturing process or the like uniformly decreasing the pixel values of pixels constituting an ML pixel group.

5. Deteriorated Pixel Correction Processing

The following will describe a method for correcting a deteriorated pixel in the case where image generation processing is performed using the LF data including the deteriorated pixel.

As described above, when a subject is in focus at a two-dimensional position of an ML pixel group on the reconstruction plane, the pixels included in the ML pixel group other than the deteriorated pixel have substantially the same pixel value. Accordingly, the pixel value of the deteriorated pixel is corrected using the pixel value of the other pixels included in the same ML pixel group. In the example of the ML pixel group 50d shown in FIG. 1, the pixel value of the deteriorated pixel 202d is corrected by being replaced by the average value of the pixel values of the other pixels 202a, 202b, 202c, and 202e that are included in the ML pixel group 50d. On the other hand, when a subject is not in focus at a two-dimensional position of an ML pixel group on the reconstruction plane, the deteriorated pixel is corrected by being multiplied by a gain of the inverse of the output ratio obtained in the disorder detection processing. Although noise of the deteriorated pixel is amplified by multiplying the deteriorated pixel by the gain, discomfort due to the influence of the noise is reduced since a region on the target reconstruction image is blurred.

Note that when the output ratio of the deteriorated pixel is higher than a predetermined value, it is considered that the effect of the foreign substance is negligible, and instead of the above-described correction processing, correction of the pixel value of the deteriorated pixel is performed only by performing multiplication using the gain of the inverse of the output ratio. This simplifies the processing with respect to the pixel that is hardly affected by the foreign substance, achieving speed-up of the processing.

Furthermore, the above-described correction processing may also use, in addition to the detection information generated in the above-described disorder detection processing, separately generated detection information. The separately generated detection information relates to disorder detection that was performed in advance, for example, before shooting, or during the manufacturing process of the digital camera 100 and is written into the storage unit 8. In the disorder detection, shooting is performed with a light source that has a uniform brightness in which all pixels on the image sensing plane have the same output if there is no foreign substance, pixels of the ML pixel group are specified, and detection information is stored.

6. Operation Sequence of Disorder Detection Processing and Correction Processing The following will describe the operation sequence of the disorder detection processing and the correction processing according to the present embodiment with reference to the flowcharts shown in FIGS. 6 and 7.

Figure 7A:
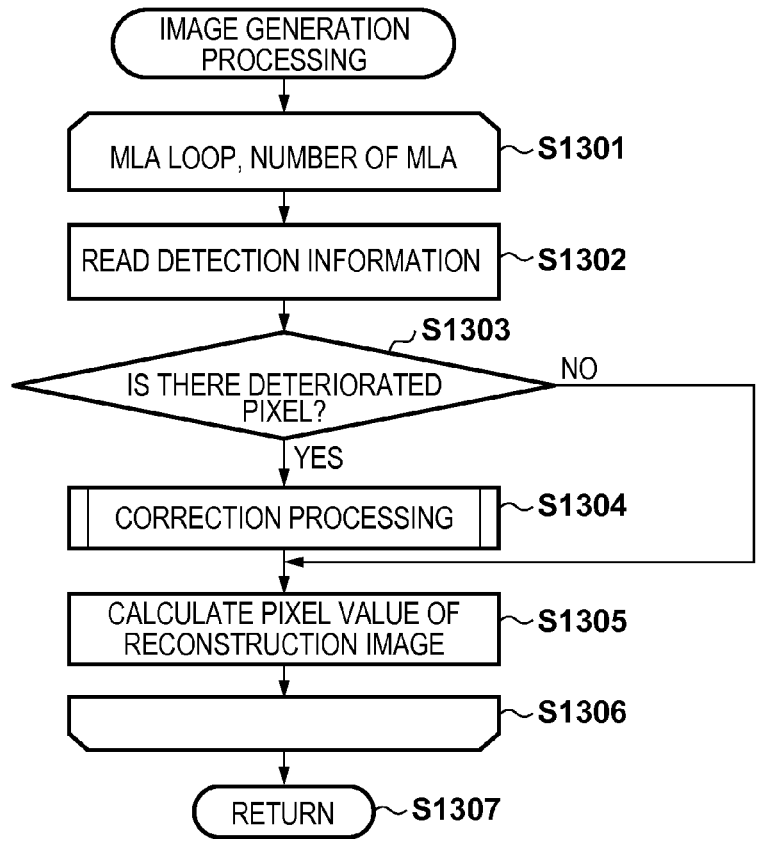
FIGS. 7A and 7B are flowcharts showing operation sequences of processing for correcting an effect of a disorder according to the first embodiment.
Figure 7B:
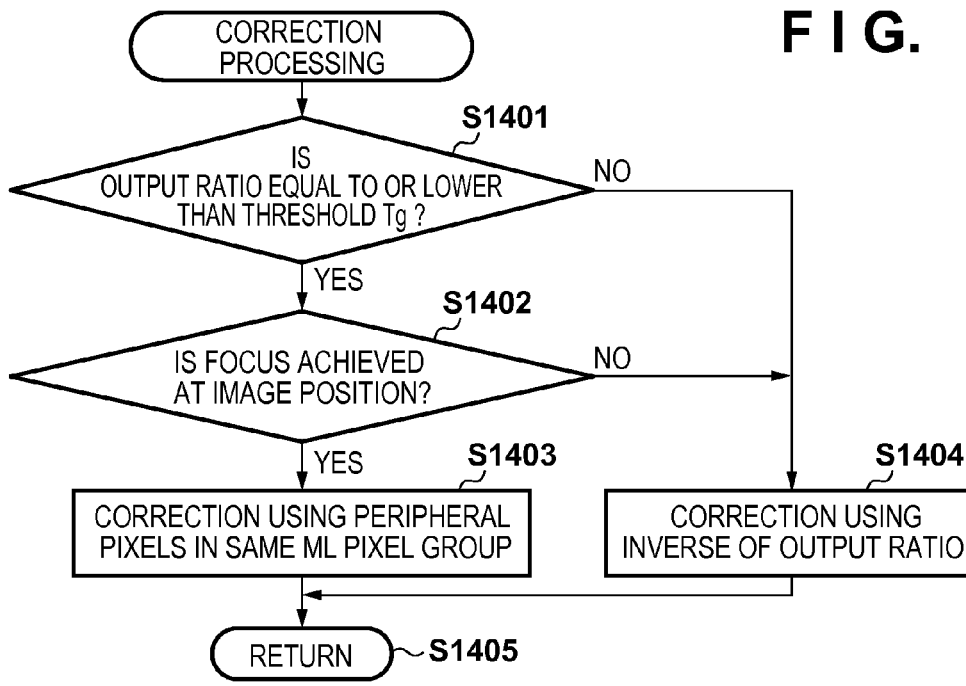

FIG. 6A is a flowchart showing the entire operation from acquisition of LF data to generation of a reconstruction image, including the disorder detection processing and the correction processing. FIG. 6B shows the operation of the disorder detection processing, FIG. 7A shows the operation of the image generation processing, and FIG. 7B shows the operation of the correction processing.

The processing corresponding to the flowchart can be realized by the camera system control unit 5 reading a processing program stored in a nonvolatile memory for example, expanding the read program on a RAM, and executing it. The present processing starts upon detecting an image acquisition instruction that is given by the release button being pressed down, for example, in the state in which the digital camera 100 is set in the shooting mode for example.

When the processing starts, first in step S1001, the image processing unit 7 acquires LF data that is acquired by image-capturing under control of the camera system control unit 5. Specifically, when the camera system control unit 5 gives the instruction to the lens system control unit 12 via the electrical contact 11, the lens system control unit 12 controls the lens driving unit 13 so that a shutter serving as a diaphragm operates, and the image sensor 6 is exposed under an appropriate exposure condition. Furthermore, the image sensor 6 reads an electrical charge accumulated in the light receiving elements by the exposure, and outputs the acquired analog pixel signals to the image processing unit 7. Then, the image processing unit 7 performs processing, such as A/D conversion or correction, on the analog pixel signal, and thereby acquires the LF data.

In step S1002, the camera system control unit 5 detects subject distances at two-dimensional positions of the acquired LF data. Specifically, the camera system control unit 5 calculates subject distances at two-dimensional positions using information on focal positions at which subjects at the two-dimensional positions are in focus, based on two-dimensional output of a focus detection unit (not shown) according to a phase difference detection method, for example. Here, "subjects at the two-dimensional positions" refer to subjects appearing on the two-dimensional coordinates on a reconstruction image when being in focus. The focus detection unit may also be a unit according to a contrast detection method in which focus detection is performed using a contrast change of an image caused by, for example, a focus lens of an image-capturing optical system being driven. When having acquired the information on the subject distances of the two-dimensional positions, the camera system control unit 5 stores the information in the RAM.

In step S1003, the image processing unit 7 sets a subject distance at which disorder pixel detection is performed, and generates LF data in which a ray distribution of a reconstruction plane that is focused at the subject distance is reproduced. Specifically, the image processing unit 7 applies the image shift processing to the LF data acquired in step S1001, and rearranges pixels of the LF data so that the ray distribution that is focused at the set subject distance. That is, the image processing unit 7 specifies a position on the reconstruction plane through which a light flux corresponding to each pixel of the LF data passes, and calculates the shift amount (movement amount at the time of rearranging) of the corresponding pixel of the LF data. Then, the image processing unit 7 rearranges the pixels based on the calculated shift amounts, and generates post-shift LF data.

In step S1004, the image processing unit 7 specifies a two-dimensional position of the subject that is present at the set subject distance, and performs disorder detection processing, which will be described later, on the pixel group at that position of the post-shift LF data. Note that as described above, it is assumed that the disorder detection processing is performed with respect to not only the subject distance set in step S1003 but also another subject distance, in order to determine whether a decrease in pixel value output is due to a sensitivity defect of the semiconductor or a microlens disorder.

In step S1005, the image processing unit 7 performs image generation processing for generating a reconstruction image. In this processing, the image processing unit 7 performs correction processing on a deteriorated pixel detected in step S1004, and generates a reconstruction image in which an effect of a foreign substance is corrected. The operations of the image generation processing and the correction processing will be described later with reference to FIGS. 7A and 7B, respectively.

In step S1006, the camera system control unit 5 displays the reconstruction image generated by the image generation processing on the display unit 9, and ends the operation sequence. The storage unit 8 stores the reconstruction image acquired in accordance with an instruction of the camera system control unit 5 in the storage unit 8.

Hereinafter, operations of the disorder detection processing will be described in detail with reference to FIG. 6B. The image processing unit 7 performs processing on pixels constituting an ML pixel group that corresponds to each microlens. That is, by the image shift processing, processing is sequentially performed with respect to the microlenses that correspond to ML pixel groups (FIG. 1, the ML pixel groups 50c to 50e) on a given reconstruction plane. Therefore, the image processing unit 7 performs processing repeatedly as many times as the number of the microlenses. Steps S1201 to S1203 and S1204 to S1210 below form loops of the repeated processing.

In step S1201, the image processing unit 7 determines whether or not the loop processing from steps S1201 to S1203 has been executed as many times as the number of the microlenses of the MLA 20. If the image processing unit 7 determines that the loop processing has been executed as many times as the number of the microlenses, the procedure advances to step S1204 from the loop. If the image processing unit 7 determines that the loop processing has not been executed as many times as the number of the microlenses, a microlens on which no loop processing has not yet been executed is selected and the procedure advances to step S1202.

In step S1202, the image processing unit 7 specifies the largest value of the pixel values of the pixels constituting the ML pixel group, calculates an output ratio by dividing each pixel value of the pixels by the specified largest value, and stores the calculated output ratios in the RAM.

In step S1204, similarly to step S1201, loop calculation is executed as many times as the number of microlenses constituting the MLA 20. In step S1204, the image processing unit 7 determines whether or not the loop processing from steps S1204 to S1210 has been executed as many times as the number of the microlenses of the MLA 20. If the image processing unit 7 has determined that the loop processing has been executed as many times as the number of the microlenses, the procedure advances to step S1211 from the loop. If the image processing unit 7 has determined that that the loop processing has not been executed as many times as the number of the microlenses, a microlens on which no loop processing has not yet been executed is selected and the procedure advances to step S1205.

In step S1205, the image processing unit 7 determines whether or not focus is achieved at a targeted two-dimensional position on the reconstruction plane. The image processing unit 7 reads information that relates to two-dimensional positions at which focus is achieved and is stored in the RAM in step S1002, and determines whether or not focus is achieved at the targeted two-dimensional position. If the image processing unit 7 has determines that focus is not achieved at the two-dimensional position, the procedure advances to step S1210, and if focus is achieved at the two-dimensional position, the procedure advances to step S1206.

In step S1206, the image processing unit 7 extracts a pixel having an output ratio that is lower than a predetermined threshold T using the output ratios of the pixels of the ML pixel group stored in step S1202. If there is no pixel whose output ratio is lower than the threshold T among the pixels constituting the ML pixel group, the image processing unit 7 advances the procedure to step S1210, and if there is a pixel whose output ratio is lower than the threshold T, the image processing unit 7 advances the procedure to step S1207. Note that the pixel whose output ratio is lower than the threshold T is a pixel that may be affected by a foreign substance.

In step S1207, the image processing unit 7 specifies the ML pixel group, on the image sensing plane, that includes the pixel that may be affected by a foreign substance, and acquires the output ratios of the pixels constituting the ML pixel group.

In the example of FIG. 1, focus is achieved at two-dimensional positions of the ML pixel groups 50c, 50d, and 50e on the reconstruction plane 42, and in the case of the ML pixel group 50d, the output ratio of the pixel 202d is determined to be lower than the threshold T. The image processing unit 7 specifies the ML pixel group 50b that includes the pixel 202d on the image sensing plane, and acquires the output ratios of the pixels (that is, the pixels 201b, 201c, 201e, and 203b) that constitute this ML pixel group 50b.

In step S1208, the image processing unit 7 determines the number of pixels whose output ratios are smaller than the predetermined output ratio (for example, the threshold T as with the above-described case), among the pixels constituting the ML pixel group acquired in step S1207. The image processing unit 7 determines whether or not the number of the pixels whose output ratios are lower exceeds a preset constant N, that is, a constant for use in determining whether or not a foreign substance is attached to the microlens.

The image processing unit 7 determines that the number of the pixels whose output ratios are lower is smaller than the constant N, the procedure advances to step S1210, and if the number of the pixels whose output ratios are lower is N or more, the procedure advances to step S1209.

In the example of FIG. 1, the output ratio of the pixel 202d, which is the largest value of the pixels of the ML pixel group 50d, is the same as the output ratio of the pixels 201a, 201c, and 201e, which is the largest value of the pixels of the ML pixel group 50c, and is lower than the threshold T. Similarly, the output ratio of the pixel 203b, which is the largest value of the pixels of the ML pixel group 50e, is also lower than the threshold T. In this case, the number of the pixels whose output ratios are lower than the threshold T exceeds a threshold N.

In step S1209, the image processing unit 7 determines that a foreign substance is attached to a microlens on the image sensing plane, and stores the detection information in the RAM. The image processing unit 7 stores the position of the microlens to which the foreign substance is attached, addresses of the pixels (that is, deteriorated pixels) corresponding to that microlens on the image sensing plane, and the output ratios of the pixels, as detection information. In the example of FIG. 1, if it is determined that a foreign substance is attached to the microlens 20e, the image processing unit 7 stores the microlens 20e, the addresses of the corresponding pixels 200a to 200e, and their output ratios, as detection information. Note that the pixels 201a, 201c, 201e, 202d, and 203b on the reconstruction plane may be specified and stored as information for specifying pixels.

In step S1211, the image processing unit 7 invokes the processing and returns to original step S1004.

The following will describe operation of the image generation processing with reference to FIG. 7A. Similarly to the above-described disorder detection processing, the image processing unit 7 performs processing on the ML pixel group that corresponds to each microlens of the MLA 20 using the post-shift LF data generated in step S1003. Steps S1301 to S1306 form a loop of the repeated processing.

In S1301, the image processing unit 7 determines whether or not the loop processing from steps S1301 to S1306 has been executed as many times as the number of microlenses of the MLA 20. If the image processing unit 7 determines that the loop processing has been executed as many times as the number of the microlenses, the procedure advances to step S1307 from the loop. If the image processing unit 7 determines that the loop processing has not been executed as many times as the number of the microlenses, a microlens on which no loop processing has not yet been executed is selected and the procedure advances to step S1302.

In step S1302, the image processing unit 7 reads the detection information stored in the RAM, and acquires the addresses of deteriorated pixels and the output ratios thereof that were affected by the foreign substance. The image processing unit 7 reads, in addition to the detection information generated in step S1004, detection information generated before the image-capturing or in the manufacturing when it is stored in the storage unit.

In step S1303, the image processing unit 7 determines whether or not the ML pixel group includes the deteriorated pixel based on the post-shift LF data and the detection information. If the image processing unit 7 determines that the ML pixel group does not include the deteriorated pixel, the procedure advances to step S1305. If the image processing unit 7 determines that the ML pixel group includes the deteriorated pixel, the procedure advances to step S1304.

In step S1304, the image processing unit 7 executes the correction processing on the deteriorated pixels included in the ML pixel groups, and corrects the pixel values of the deteriorated pixels. The operation of the correction processing will be described in detail later with reference to FIG. 7B.

In step S1305, the image processing unit 7 calculates the pixel value of a reconstruction image by summing up the pixel values of the ML pixel group based on the read post-shift LF data and the corrected pixel value. Note that the image processing unit 7 sets all weighting coefficients of the pixels to 1 when summing up the pixel values of the ML pixel group. However, it is also possible to change the f-number by performing multiplication using the weighting coefficient depending on the position of the 5×5 grid of the ML pixel group.

In step S1307, the image processing unit 7 ends the generation of the reconstruction image, and invokes the procedure and returns to original step S1004.

Furthermore, the operation of the correction processing will be described in detail with reference to FIG. 7B.

In step S1401, the image processing unit 7 determines whether or not the output ratio of the deteriorated pixel acquired in step S1302 is lower than a predetermined threshold Tg. If the image processing unit 7 determines that the output ratio of the deteriorated pixel is lower than the threshold, the procedure advances to step S1402, and if the output ratio of the deteriorated pixel is larger than the threshold, the procedure advances to step S1404. By branching the processing according to the output ratio, the image processing unit 7 can perform more simplified correction processing when the effect of a foreign substance on the deteriorated pixel is small.

In step S1402, the image processing unit 7 determines whether or not focus is achieved at the two-dimensional position of the ML pixel group based on the result of the focus detection processing in step S1002. If the image processing unit 7 determines that focus is achieved at the two-dimensional position, the procedure advances to step S1403, and if focus is not achieved at the two-dimensional position, the procedure advances to step S1404.

In step S1403, the image processing unit 7 performs correction of the deteriorated pixel using the pixel values of the pixels of the same ML pixel group other than the deteriorated pixel. The image processing unit 7 obtains an average value of the pixel values of the pixels other than the deteriorated pixel, and replaces the pixel value of the deteriorated pixel by the obtained average value. After the image processing unit 7 has performed the correction of the deteriorated pixel, the procedure advances to step S1405.

In step S1404, the image processing unit 7 performs correction with respect to the pixel value of each deteriorated pixel of the ML pixel group, by multiplying the pixel value by the inverse of the output ratio included in the detection information. After the image processing unit 7 has performed correction on the deteriorated pixels of the ML pixel group, the procedure advances to step S1405.

In S1405, the image processing unit 7 ends the correction processing, and invokes the processing and returns to original step S1305.

According to the present embodiment, in the disorder detection processing, the output ratio that is obtained by using the largest value of the pixel values of pixels constituting an ML pixel group is used, but another method may also be used. For example, the image processing unit 7 may obtain deviations of the pixel values of 25 pixels of the ML pixel group, and may determine whether or not the pixels values are possibly affected by a foreign substance based on whether or not the obtained deviations are larger than a separately set threshold. Even if the largest value of the pixel values of the ML pixel group is unusual, it is possible to extract the pixel that is deviated from the tendency of pixels constituting an ML pixel group as a deteriorated pixel.

Furthermore, the camera system control unit 5 may also display, on the display unit 9, the position of a microlens at which the foreign substance is attached, and give a notification to prompt the user to clean the microlens. The user can recognize that a foreign substance is attached. Furthermore, it is also possible to assume that, when the output ratio of a deteriorated pixel that is stored in step S1209 is used, the lower the output ratio of the deteriorated pixel is, the larger the dimension of the foreign substance that shields the ray of light emitted to the microlens is. The camera system control unit 5 can display, together with a warning on the display unit 9, the estimated dimension of a foreign substance, and change the warning content step-wisely according to the dimension of the estimated foreign substance. The user can recognize more specifically the state in which a foreign substance is attached, and can thus easily determine a cleaning method or time.

As described above, in the present embodiment, a pixel whose pixel output is decreased is specified by comparing the output ratios of pixels constituting a ML pixel group in which focus is achieved on the reconstruction plane. Furthermore, it is possible to detect output variation of a pixel signal due to an external factor by comparing the output ratios of the pixels constituting the ML pixel group including the pixel on the image sensing plane. Furthermore, it is possible to correct the pixel value of the pixel whose output is decreased by using the pixel values of the ML pixel group in which focus is achieved on the reconstruction plane. Performance of the correction can reduce deterioration in image quality of a reconstruction image to be generated.

Second Embodiment

Hereinafter, a second embodiment will be described. In the second embodiment, when there are many deteriorated pixels in an ML pixel group on the reconstruction plane, the ML pixel group including the deteriorated pixels is distributed by defocusing a light flux that is incident on the image sensing plane, thereby increasing the accuracy of the correction processing. A digital camera 100 of the present embodiment has the same configuration as that of the first embodiment, and the operations other than an operation added between the focus detection processing and the image generation processing are the same as those of the first embodiment. Therefore, redundant descriptions are omitted and differences are mainly described.

Correction processing according to the present embodiment will be described with reference to FIGS. 8 and 9. In the first embodiment, correction of outputs of deteriorated pixels of a ML pixel group in which focus is achieved on the reconstruction plane is performed using other pixels constituting the same ML pixel group. However, when, for example, the ratios of the deteriorated pixels in the ML pixel group are relatively high, the correction may not appropriately be performed and an image may be deteriorated. In the example of FIG. 1, the ML pixel group 50c includes the three deteriorated pixels 201a, 201c, and 201e, and the accuracy of correction may be lower than the ML pixel group 50d that includes one deteriorated pixel 202d. Accordingly, when an ML pixel group includes a given number of deteriorated pixels, the image processing unit 7 performs optical system adjustment (focus lens driving) so that the number of the deteriorated pixels in the ML pixel group is smaller than the given number, and uses newly acquired LF data to perform correction.

Figure 8:
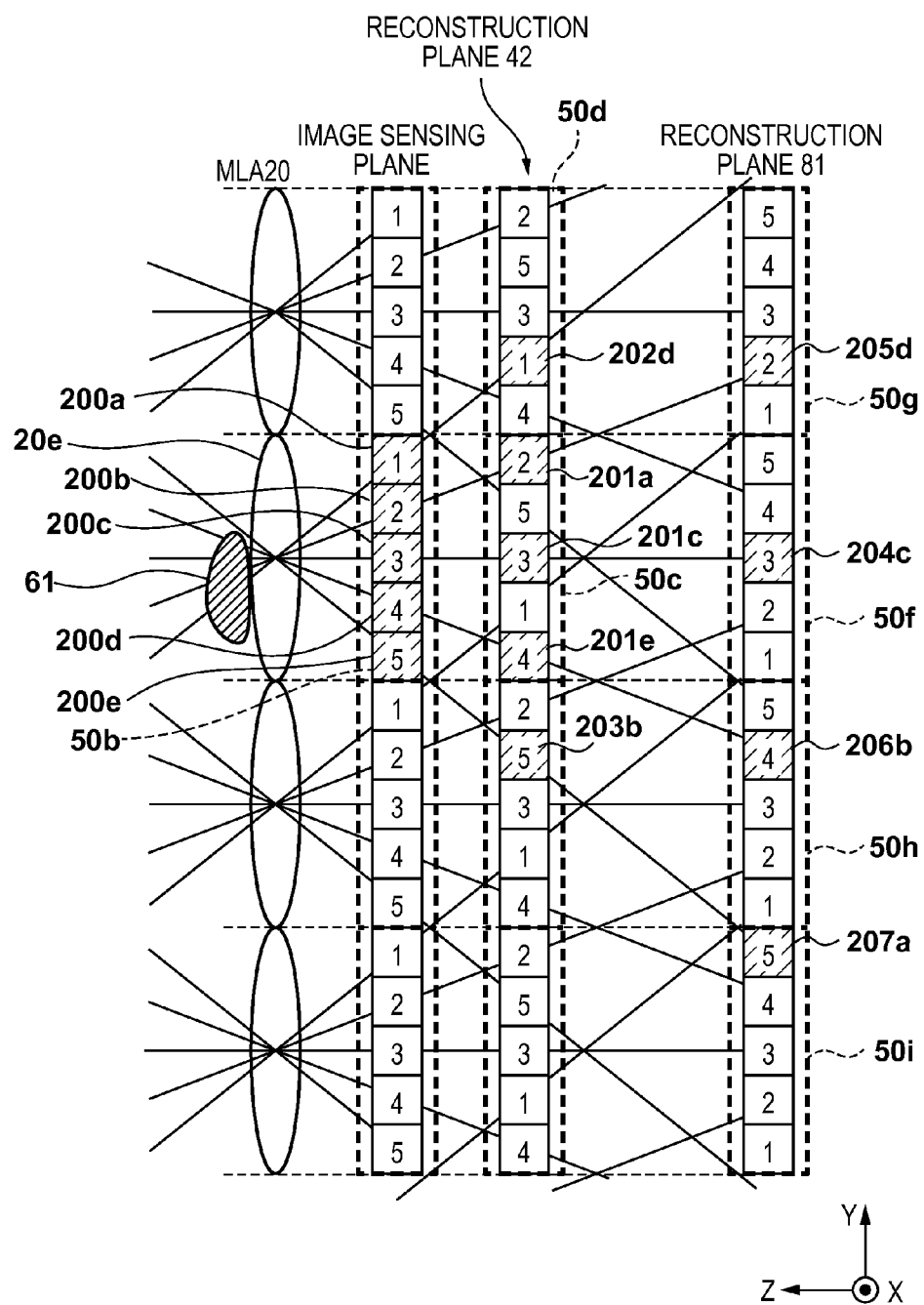
FIG. 8 is a diagram schematically showing processing for correcting an effect of a disorder according to a second embodiment.

FIG. 8 schematically shows a method for generating a reconstruction image according to the present embodiment. The difference from FIG. 1 lies in that when a plane that is set for generating a reconstruction image in a desired focus state is the reconstruction plane 42 according to the initially acquired LF data, the plane is changed to the reconstruction plane 81 that is farther distanced from the image sensing plane than that reconstruction plane in the LF data newly acquired after optical system adjustment. Since the ML pixel group 50c on the reconstruction plane 42 includes three deteriorated pixels, the accuracy of correction of the outputs of the deteriorated pixels 201a, 201c, and 201e may deteriorate when using pixels other than the deteriorated pixels. Note that if a plane that corresponds to the subject distance at which focus is achieved is the image sensing plane, and all the pixels included in the ML pixel group 50b are deteriorated pixels, it is, of course, not possible to perform correction using a pixel other than the deteriorated pixels.

On the other hand, the reconstruction plane 81 includes the ML pixel groups 50f, 50g, 50h, and 50i, and each of the pixel groups includes one deteriorated pixel (pixels 204c, 205d, 206b, and 207a). That is, since the number of deteriorated pixels in each ML pixel group on the reconstruction plane 81 is reduced to one, the accuracy increases in correction using pixels other than the deteriorated pixel of the ML pixel group in which focus is achieved. Therefore, in the present embodiment, when a subject is in focus at a two-dimensional position that corresponds to the ML pixel group 50c on the reconstruction plane 42, the camera system control unit 5 moves a focus lens group of the imaging optical system 3 so that the defocus amount (blurring amount) on the image sensing plane is high. Specifically, the camera system control unit 5 moves the focus lens group so that the subject is in focus at a two-dimensional position corresponding to the ML pixel group 50c on the reconstruction plane 81, and newly acquires LF data. The camera system control unit 5 performs correction processing on the newly acquired LF data, and obtains a reconstruction image on the reconstruction plane 81. By moving the focus lens group, it is possible to bring the subject at a two-dimensional position that is in focus on the reconstruction plane 42 based on the initially acquired LF data, into focus on the reconstruction plane 81 that includes the smaller number of deteriorated pixels for each ML pixel group based on the newly acquired LF data. Therefore, it is possible to perform correction more appropriately.

Figure 9:
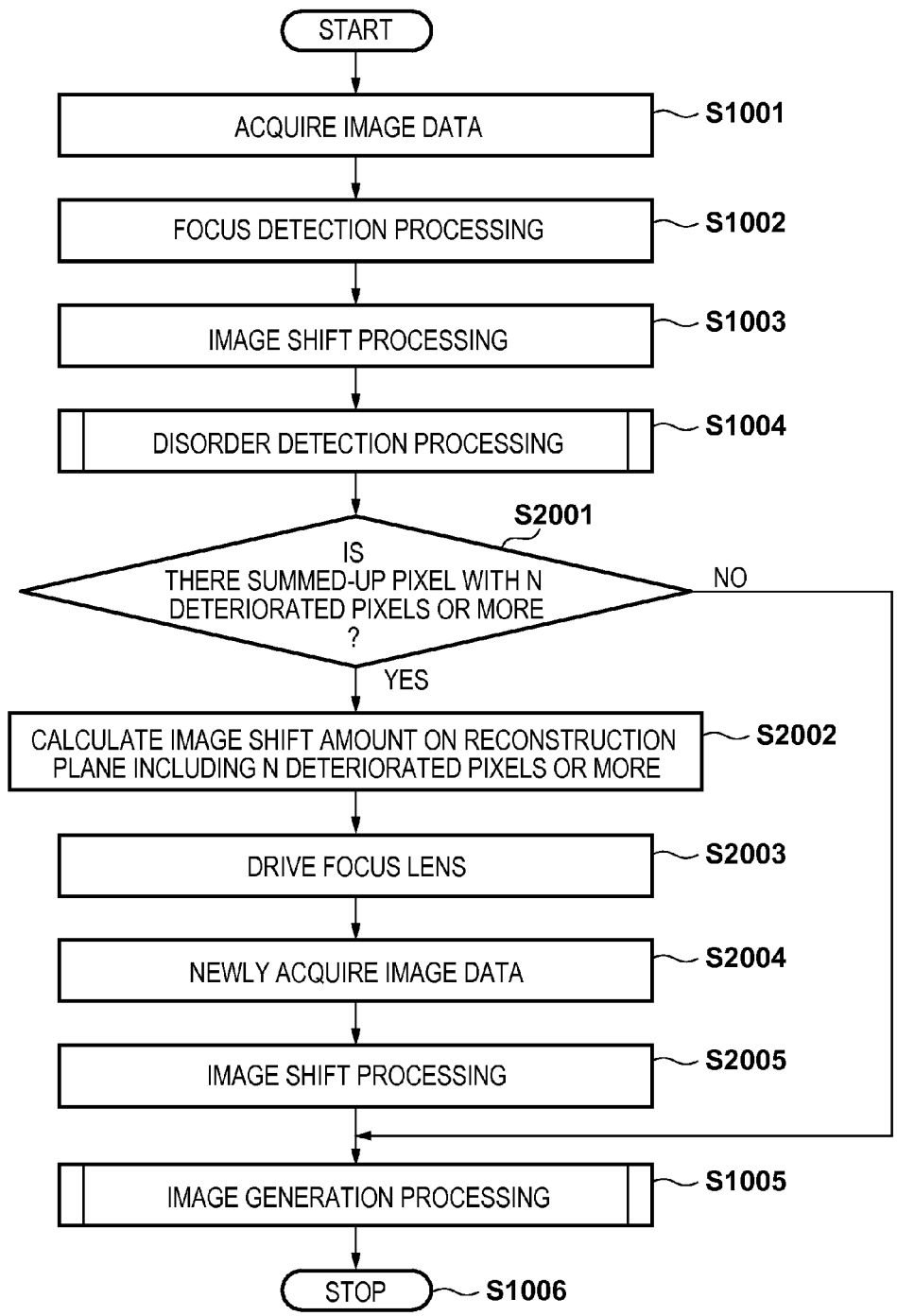
FIG. 9 is a flowchart showing an operation sequence of processing for correcting an effect of a foreign substance according to the second embodiment.

The following will describe processing for acquiring LF data (new LF data) that is to be used for the correction processing of the second embodiment and generating a reconstruction image, with reference to the flowchart of FIG. 9. In the description of the processing for generating a reconstruction image in the present embodiment, the same reference numerals are given to the steps of the same operations as those of the first embodiment shown in FIG. 6A, and descriptions thereof are omitted. In the following, only characterized steps of the present embodiment are described.

After the disorder detection Processing in step S1004, the image processing unit 7 determines in step S2001 whether or not an ML pixel group in which a subject is in focus includes a predetermined number or more of deteriorated pixels, on the reconstruction plane that is defined by the post-shift LF data. If the number of the deteriorated pixels in the ML pixel group is less than N, the image processing unit 7 advances the procedure to step S1005. On the other hand, if the number of the deteriorated pixels in the ML pixel group is N or more, the procedure advances to step S2002.

In step S2002, the image processing unit 7 calculates a shift amount, when image shift processing is further performed from the target reconstruction plane, the shift amount being such that the number of the deteriorated pixels of each ML pixel group in which a subject is in focus on the reconstruction plane after shifting is less than N. The image processing unit 7 reproduces an arrangement of pixels when the reconstruction plane is gradually moved using the post-shift LF data, and specifies a reconstruction plane on which the number of the deteriorated pixel of a ML pixel group in which focus is achieved is less than a predetermined number. The image processing unit 7 calculates the shift amount for use in constructing the specified reconstruction plane.

In step S2003, the camera system control unit 5 obtains a change amount of the focal position that corresponds to the shift amount calculated in step S2002. Then, the camera system control unit 5 transmits the obtained change amount of the focal position to the lens system control unit 12, and drives the focus lens group using the lens driving unit 13.

In step S2004, the camera system control unit 5 exposures the image sensor 6 under an appropriate exposure condition, and newly acquires LF data on the focal position that is different from the LF data obtained in step S1001.

In step S2005, the image processing unit 7 performs image shift processing on the LF data obtained in step S2004. That is, the image processing unit 7 rearranges the pixels of the LF data for reproducing the reconstruction plane specified in step S2002, and generates the post-shift LF data.

In the steps S1005 onward, the image processing unit 7 performs the image generation processing including correction of deteriorated pixels using the generated post-shift LF data, and generates the reconstruction image. When the reconstruction image generation processing is completed, the sequence of processing ends.

As described above, in the present embodiment, when a ML pixel group in which focus is achieved on a desired reconstruction plane includes a plurality of deteriorated pixels, a focus lens is driven so that an image on the reconstruction plane is further defocused. A focused reconstruction plane that is equivalent to the reconstruction plane before the focus lens is driven is obtained, and the number of deteriorated pixels in the ML pixel group is reduced. By performing correction of the deteriorated pixels using other pixels of the ML pixel group in which focus is achieved on the obtained reconstruction plane, it is possible to perform appropriate correction processing for the detected attachment of a foreign substance in which the effect of the foreign substance is further reduced.

Third Embodiment

The following will describe a third embodiment according to the present invention with reference FIGS. 8 and 10.

In the first embodiment, if focus is not achieved at a two-dimensional position on the reconstruction plane at which deteriorated pixels exist, correction of the pixels is performed by performing multiplication using the gains of the inverses of the output ratios. In this case, as described above, when the pixel values of pixels of an ML pixel group are summed up in the image generation processing assuming that the weighting coefficient is 1, the influence of noise due to the correction is not likely to be noticeable. However, when a reconstruction image having, for example, a large f-number is generated, a pixel of the ML pixel group is used as having the weighting coefficient of 1, and thus, when this pixel is a deteriorated pixel, the influence of the noise due to the correction is likely to be noticeable. Furthermore, even when pixels of an ML pixel group are used in a restricted manner in order to generate an image for stereoscopic display or an image having different parallax, the influence of the noise due to the correction is also not likely to be noticeable.

Therefore, in the third embodiment, when focus is not achieved at a two-dimensional position at which deteriorated pixels exist on a predetermined reconstruction plane, a reconstruction plane on which an ML pixel group including the deteriorated pixels is in focus is searched for. On the new reconstruction plane that was found, correction is performed using other pixels constituting the ML pixel group so as to correct the pixel values of the deteriorated pixels more appropriately.

In FIG. 8, it is assumed that focus is not achieved at the two-dimensional position of the ML pixel group 50*c* on the reconstruction plane 42, and the ML pixel group 50*f* that is included at the same two-dimensional position on the reconstruction plane 81 is in focus. At that time, the deteriorated pixel 201*c* included in the ML pixel group 50*c* is not in focus at the two-dimensional position of the ML pixel group 50*c*, and thus cannot be corrected using other pixels of the same ML pixel group 50*c*. On the other hand, since the ML pixel group 50*f* on the reconstruction plane 81 that includes the deteriorated pixel 204*c* that is obtained by shifting the pixel 201*c* is in focus, the deteriorated pixel 204*c* can be corrected using other pixels of the ML pixel group 50*f*.

Hereinafter, operation of correction processing according to the present embodiment will be described with reference to FIG. 10. FIG. 10 is a flowchart showing the operation of the correction processing included in the image generation processing, and can be replaced by the correction processing of FIG. 7B of the first embodiment. Other operations are the same as those of the first embodiment.

In step S3401, the image processing unit 7 determines whether or not the output ratio of a deteriorated pixel is a threshold Tg or smaller using the acquired detection information. If the image processing unit 7 has determined that the output ratio of the deteriorated pixel is the threshold Tg or smaller, the procedure advances to step S3402, and if the output ratio is larger than the threshold Tg, the procedure advances to step S3406.

In step S3402, the image processing unit 7 determines whether or not the two-dimensional position of the ML pixel group including a deteriorated pixel that is to be corrected is in focus, as a result of the focus detection processing in step S1002. If the image processing unit 7 has determined that the two-dimensional position of the ML pixel group is in focus, the procedure advances to step S3403, and if the two-dimensional position is not in focus, the procedure advances to step S3404.

Step S3403 is the same as step S1403 of the first embodiment. The image processing unit 7 obtains an average value of the pixel values of pixels of the same ML pixel group other than the deteriorated pixel, and replaces the pixel value of the deteriorated pixel by the average value. After the image processing unit 7 performs correction by the replacement, the procedure advances to step S3407.

In S3404, the image processing unit 7 searches for a reconstruction plane in which a two-dimensional position at which the target deteriorated pixel is arranged is in focus, based on the post-shift LF data generated in step S1003, and an ML pixel group including the deteriorated pixel on the found reconstruction plane.

In step S3405, the image processing unit 7 replaces the output of the deteriorated pixel using pixels other than the target deteriorated pixel, among the ML pixel group including the target deteriorated pixel on the found reconstruction plane. After the image processing unit 7 performs correction by the replacement, the procedure advances to step S3407.

In step S3406, the image processing unit 7 executes the same processing as that in step S1403 of the first embodiment, and corrects the target deteriorated pixel. That is, the image processing unit 7 calculates an average value of the pixel values of pixels of the ML pixel group other than the deteriorated pixel, and replaces the output of the deteriorated pixel by the average value.

In step S3407, the image processing unit 7 invokes the procedure and returns to the original step S1205.

As described above, the present embodiment is configured, even when focus is not achieved at the two-dimensional position of an ML pixel group that includes a deteriorated pixel, to search for a reconstruction plane on which the ML pixel group is in focus. Accordingly, it is possible to perform appropriate correction using the pixels of the ML pixel group in which focus is achieved, and to reduce deterioration of the reconstruction image.

Note that in the present embodiment, description is given on the assumption that the digital camera 100 is configured to perform processing for detecting a deteriorated pixel and then correcting the deteriorated pixel, but the detection processing and the correction processing may be separated. With respect to the digital camera 100 configured to perform only correction processing without performing the detection processing, it is also possible to use detection information on detection that is performed in, for example, the manufacturing process of the digital camera 100 using the present invention. At that time, the detection processing may also be performed by an adjustment apparatus that is used separately in the manufacturing process, and the generated detection information is stored in the digital camera 100.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-076458, filed Apr. 2, 2014, which is hereby incorporated by reference herein in its entirety.

What is claimed is:

1. An image processing apparatus comprising:
an acquiring unit configured to acquire pixel signals in which light fluxes from a subject are stored, each pixel signal being such that a pixel has stored a pupil-divided light flux obtained by performing pupil division on the light flux incident on a region that is associated with that pixel;
a determination unit configured to determine, with respect to pixels of the pixel signals that are associated with a predetermined region, whether or not a pixel value of each pixel satisfies a predetermined relationship to a pixel value of a pixel having stored another light flux from the same subject as that of that pixel of the pixel signals; and
a detection unit configured to detect that there is an external factor that varies the pixel value in the predetermined region if the pixels of the pixel signals that are associated with the predetermined region include a predetermined number or more of pixels that are determined to satisfy the predetermined relationship by the determination unit.

2. The apparatus according to claim 1,
wherein the determination unit determines whether or not a first pixel that is associated with the predetermined region satisfies the predetermined relationship based on a ratio of a pixel value of the first pixel to a pixel value of a second pixel having stored another light flux from the same subject as that of the first pixel.

3. The apparatus according to claim 2,
wherein the determination unit determines that the first pixel satisfies the predetermined relationship if the ratio of the pixel value of the first pixel to the pixel value of the second pixel is a threshold or smaller.

4. The apparatus according to claim 2,
wherein the determination unit determines that the first pixel satisfies the predetermined relationship if the pixel value of the second pixel having stored the other light flux from the same subject as that of the first pixel is larger than the pixel value of the first pixel that is associated with the predetermined region.

5. The apparatus according to claim 2,
wherein the determination unit determines that the first pixel satisfies the predetermined relationship if a deviation of the pixel value of the first pixel that is associated with the predetermined region from pixel values of a plurality of second pixels that have stored other light fluxes of the same subject as that of the first pixel exceeds a predetermined value.

6. The apparatus according to claim 2,
wherein the determination unit outputs a ratio of the pixel value of the first pixel to the pixel value of the second pixel, and
the detection unit detects that there is an external factor if the ratios output with respect to a plurality of pixels that are associated with the predetermined region and determined to satisfy the predetermined relationship are uniform.

7. The apparatus according to claim 1, further comprising:
a storage unit configured to store a result of detection by the detection unit.

8. The apparatus according to claim 1, further comprising:
a notification unit configured to perform notification when it is detected by the detection unit that there is an external factor that varies the pixel value in the predetermined region.

9. The apparatus according to claim 1, further comprising:
a correcting unit configured to correct, if it is detected by the detection unit that there is the external factor in the predetermined region, a pixel value of a pixel that is associated with the predetermined region using a pixel value of a pixel having stored another light flux from the same subject as that of the pixel; and
a generating unit configured to generate a reconstruction image that is in focus at a predetermined subject distance using the corrected pixel value of the pixel.

10. The apparatus according to claim 9,
wherein the correcting unit corrects the pixel value of the pixel that is associated with the predetermined region using an average value of pixel values of a plurality of pixels having stored other light fluxes from the same subject as that of the pixel.

11. The apparatus according to claim 1,
wherein if the pixels of the pixel signals that are associated with the region in which it is detected that there is the external factor include a predetermined number or more of pixels that are determined to satisfy the predetermined relationship, the acquiring unit newly acquires pixel signals obtained by adjusting focal positions of the light fluxes so that the number of the pixels that are included in that region and determined to satisfy the predetermined relationship is less than a predetermined number.

12. An image capturing apparatus comprising:
an image-capturing unit configured to store pixel signals in which light fluxes from a subject are stored by receiving a pupil-divided light flux that has passed through the imaging optical system; and
the image processing apparatus according to claim 1,
wherein the acquiring unit of the image processing apparatus acquires the pixel signals stored by the image-capturing unit.

13. A control method of an image processing apparatus, the control method comprising:
an acquisition step of acquiring pixel signals in which light fluxes from a subject are stored, each pixel signal being such that a pixel has stored a pupil-divided light flux obtained by performing pupil division on the light flux incident on a region that is associated with that pixel;
a determination step of determining, with respect to pixels of the pixel signals that are associated with a predetermined region, whether or not a pixel value of each pixel satisfies a predetermined relationship to a pixel value of a pixel having stored another light flux from the same subject as that of that pixel of the pixel signals; and a detection step of detecting that there is an external factor that varies the pixel value in the predetermined region if the pixels of the pixel signals that are associated with the predetermined region include a predetermined number or more of pixels that are determined to satisfy the predetermined relationship in the determination step.

14. A non-transitory computer-readable storage medium storing a program causing a computer to function the each unit of the image processing apparatus according to claim 1.

* * * * *